(12) United States Patent
Okuda

(10) Patent No.: US 7,821,872 B2
(45) Date of Patent: Oct. 26, 2010

(54) METHOD FOR ULTRASONIC WAVE TRANSMISSION AND APPARATUS FOR ULTRASONIC WAVE TRANSMISSION

(75) Inventor: Yasuyuki Okuda, Aichi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/219,962

(22) Filed: Jul. 31, 2008

(65) Prior Publication Data
US 2009/0059726 A1 Mar. 5, 2009

(30) Foreign Application Priority Data
Aug. 31, 2007 (JP) .............................. 2007-225674

(51) Int. Cl.
*G01V 1/18* (2006.01)
*H01L 41/00* (2006.01)

(52) U.S. Cl. ...................................... 367/138

(58) Field of Classification Search ................. 367/105, 367/103, 138, 178; 310/334
See application file for complete search history.

(56) References Cited

U.S. PATENT DOCUMENTS

| 3,465,337 A | * | 9/1969 | Kurimura et al. ............ 367/105 |
| 4,658,385 A | * | 4/1987 | Tsuji ........................... 367/105 |
| 5,060,651 A | * | 10/1991 | Kondo et al. .................. 73/626 |
| 6,299,580 B1 | | 10/2001 | Asafusa |
| 7,329,975 B2 | | 4/2008 | Sugiura et al. |
| 7,525,237 B2 | | 4/2009 | Sugiura et al. |
| 2006/0043843 A1 | | 3/2006 | Sugiura et al. |
| 2009/0059726 A1 | * | 3/2009 | Okuda ......................... 367/178 |

FOREIGN PATENT DOCUMENTS

| JP | A-8-201512 | 8/1996 |
| JP | A-11-178823 | 7/1999 |
| JP | A-2000-009825 | 1/2000 |
| JP | A-2002-112379 | 4/2002 |
| JP | A-2004-125515 | 4/2004 |
| JP | A-2006-343309 | 12/2006 |

OTHER PUBLICATIONS

Office Action dated Apr. 21, 2009 from Japan Patent Office in the corresponding JP Application No. 2007-225674 (and English Translation).

* cited by examiner

*Primary Examiner*—Dan Pihulic
(74) *Attorney, Agent, or Firm*—Posz Law Group, PLC

(57) ABSTRACT

A method for transmitting an ultrasonic wave is disclosed. The method includes: selecting a first combination of transmission elements from among multiple transmission elements, wherein the first combination of transmission elements includes at least two transmission elements adjacent to each other; and vibrating the transmission surfaces of the first combination of transmission elements in a substantially same phase to transmit the ultrasonic wave with a first directivity. The first directivity is different from a second directivity of the ultrasonic wave transmitted from single transmission element.

15 Claims, 9 Drawing Sheets

LENGTH OF SIDE OF TRANS. RECEP. SURFACE (mm)

METHOD FOR ULTRASONIC WAVE TRANSMISSION AND APPARATUS FOR ULTRASONIC WAVE TRANSMISSION

CROSS REFERENCE TO RELATED APPLICATION

The present application is based on Japanese Patent Application No. 2007-225674 filed on Aug. 31, 2007, the disclosure of which is incorporated herein by reference.

BACKGROUND OF THE INVENTION

1. Field of the Invention

The present invention relates to a method for ultrasonic wave transmission and an apparatus for ultrasonic wave transmission.

2. Description of Related Art

An ultrasonic sensor has been used for measuring a location of an obstacle existing forward of the ultrasonic sensor, and used for sensing a shape of the obstacle. Such an ultrasonic sensor includes a transmission element and a reception element. The transmission element transmits an ultrasonic wave, and the reception element receives and senses the ultrasonic wave reflected by an object. Thereby, the ultrasonic sensor measures, for example, a distance to the object located around the ultrasonic sensor.

This type of an ultrasonic sensor typically includes multiple sensor elements arranged in an array at given intervals. When the ultrasonic sensor measures a location of an obstacle and detects a shape of the obstacle, it is required to obtain a time interval between transmission and reception of the ultrasonic wave. Further, it is required to obtain a difference in time or phase between the ultrasonic wave received with one sensor element and that received with another sensor element. In the above case, the ultrasonic wave transmitted from the transmission elements can substantially reach to only an inside of a given area. The given area determines a detection area (i.e., angle, distance etc.) for detection of an obstacle. It may be preferable to transmit the ultrasonic wave with a directivity of the ultrasonic wave being controlled.

Japanese Unexamined Patent Application Publication Number 2004-125515 shows an ultrasonic sensor that is capable of transmitting an ultrasonic wave with the directivity thereof being controlled. More specifically, the ultrasonic sensor includes a reception element and multiple transmission elements, which are sources for transmitting the ultrasonic wave. When the multiple transmission elements transmit the ultrasonic wave, the ultrasonic sensor can scan a main beam by phase-shifting.

When the above method for transmitting an ultrasonic wave is employed, a large number of transmission elements are required to increase flexibility such as an increase in a directivity control range. Thus, a size of the ultrasonic sensor may be enlarged.

SUMMARY OF THE INVENTION

In view of the above-described difficulty, it is an object of the present invention to provide an apparatus and a method for transmitting an ultrasonic wave.

According to a first aspect of the present invention, a method for transmitting an ultrasonic wave by using an ultrasonic sensor is provided. The ultrasonic sensor includes multiple transmission elements each having a transmission surface for ultrasonic wave transmission. The multiple transmission surfaces are arranged in an array. The ultrasonic sensor further includes a reception element for receiving and sensing the ultrasonic wave reflected by an object. The method includes: selecting a first combination of transmission elements from among the multiple transmission elements so that the first combination of transmission elements includes at least two transmission elements adjacent to each other; and vibrating the transmission surfaces of the first combination of transmission elements in a substantially same phase so that the transmission surfaces of the first combination vibrate in an integral manner, whereby, transmitting the ultrasonic wave with a first directivity. Single transmission element is capable of transmitting the ultrasonic wave with a second directivity different from the first directivity.

According to the above method, it is possible to transmit the ultrasonic wave in such a manner that: the first combination of transmission elements is selected from among the multiple transmission elements so that the first combination of transmission elements includes at least two transmission elements adjacent to each other; and the transmission surfaces of the first combination of transmission elements vibrate in a substantially same phase so that the transmission surfaces of the first combination vibrate in an integral manner. A detection area of an ultrasonic wave depends on an area of a transmission surface and corresponding characteristic length of the transmission surface. For example, the characteristic length may be a side length or a diagonal length when the transmission surface has a square shape, or may be a diameter when the transmission surface has a circular shape. A longer characteristic length of the transmission surface causes the ultrasonic wave to less spread. A larger area of the transmission surface causes the ultrasonic wave to have a larger sound pressure. According to the above method, the transmission surfaces of the first combination of transmission elements vibrate in a substantially same phase so that the transmission surfaces of the first combination vibrate in an integral manner. A vibration state in the above vibrating is substantially identical to another vibration state where a transmission surface having a larger area vibrates. Therefore, it is possible to transmit the ultrasonic wave whose directivity is different from that of the ultrasonic wave transmitted from single transmission element. According to the above method, depending on a combination of transmission elements for ultrasonic wave transmission, it is possible to change the detection area of the ultrasonic wave. Therefore, it is possible to realize a method for transmitting an ultrasonic wave, the method having a high flexibility of detection area control. According to the above method, since a large number of transmission elements is not required, it is possible to downsize an ultrasonic sensor.

According to a second aspect of the present invention, an apparatus for ultrasonic wave transmission is provided. The apparatus includes a multiple transmission elements, each of which has a transmission surface for ultrasonic wave transmission. The transmission surfaces of the multiple transmission elements are arranged in an array. Each transmission surface is capable of vibrating to transmit the ultrasonic wave with a first directivity. The apparatus further includes a reception element that is configured to receive and sense the ultrasonic wave reflected by an object. The apparatus further includes a circuit element. The circuit element is configured to selects a first combination of transmission elements from among the multiple transmission elements so that the first combination of transmission elements includes at least two transmission elements adjacent to each other. The circuit element is configured to cause the transmission surfaces of the first combination of transmission elements to vibrate in a substantially same phase so that the transmission surfaces of the first combination vibrate in an integral manner, and thereby, the ultrasonic wave with a second directivity is transmitted from the first combination of transmission elements. The first directivity is different from the second directivity.

According to the above apparatus, it is possible to transmit the ultrasonic wave in such a manner that: the first combination of transmission elements is selected from among the multiple transmission elements so that the first combination of transmission elements includes at least two transmission elements adjacent to each other; and the transmission surfaces of the first combination of transmission elements vibrate in a substantially same phase so that the transmission surfaces of the first combination vibrate in an integral manner. A detection area of an ultrasonic wave depends on an area of a transmission surface and corresponding characteristic length (e.g., a side length or a diagonal length in square, a diameter in circle). Accordingly, a longer characteristic length of the transmission surface causes the ultrasonic wave to less spread. A larger area of the transmission surface causes the ultrasonic wave to have a larger sound pressure. According to the above apparatus, the transmission surfaces of the first combination of transmission elements vibrate in a substantially same phase so that the transmission surfaces of the first combination vibrate in an integral manner. A vibration state in the above vibrating is substantially identical to another vibration state where a transmission surface having a larger area vibrates. Therefore, it is possible to transmit the ultrasonic wave whose directivity is different from that of the ultrasonic wave transmitted from single transmission element. According to the above apparatus, depending on a combination of transmission elements for ultrasonic wave transmission, it is possible to change the detection area of the ultrasonic wave. Therefore, it is possible to realize an apparatus for transmitting an ultrasonic wave, the apparatus having a high flexibility of detection area control. According to the above apparatus, since a large number of transmission elements is not required, it is possible to downsize the apparatus.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Example Embodiments

Figure 1A:
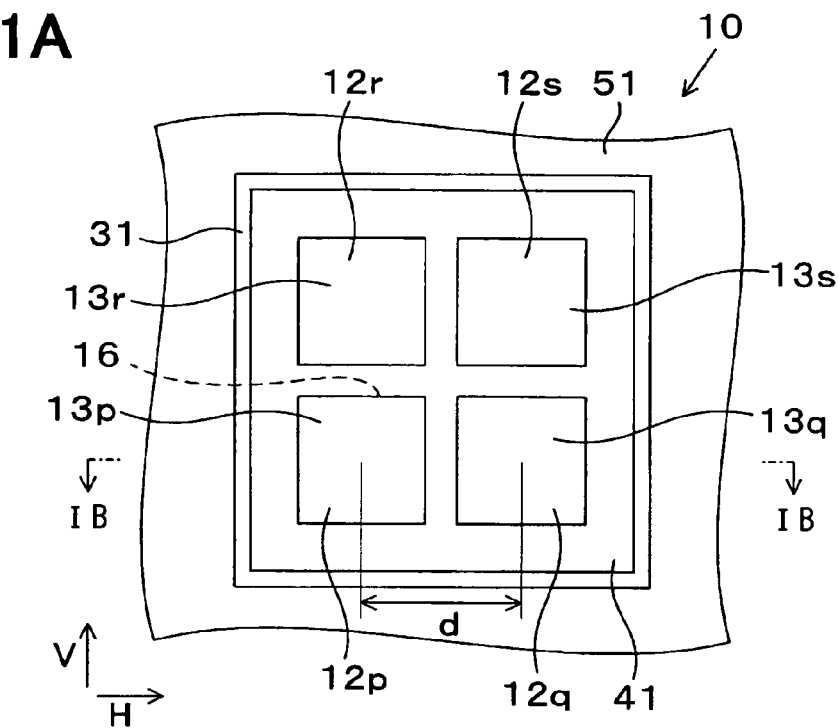
FIG. 1A is a schematic plan view diagram illustrating an ultrasonic sonic sensor viewed from an acoustic matching member side.

An apparatus and a method for transmitting an ultrasonic wave are described below with reference to the accompanying drawings. According to an exemplary use of the apparatus and the method in the present embodiments, the apparatus and the method are applied to an obstacle sensor 10 (i.e., ultrasonic sensor 10) mounted to a vehicle. In the drawings, an arrow labeled by "V" indicates a vertical direction (i.e., V direction), which is substantially perpendicular to a ground. Further, an arrow "H" in the drawings indicates a horizontal direction (H direction), which is substantially parallel to the ground.

Figure 1B:
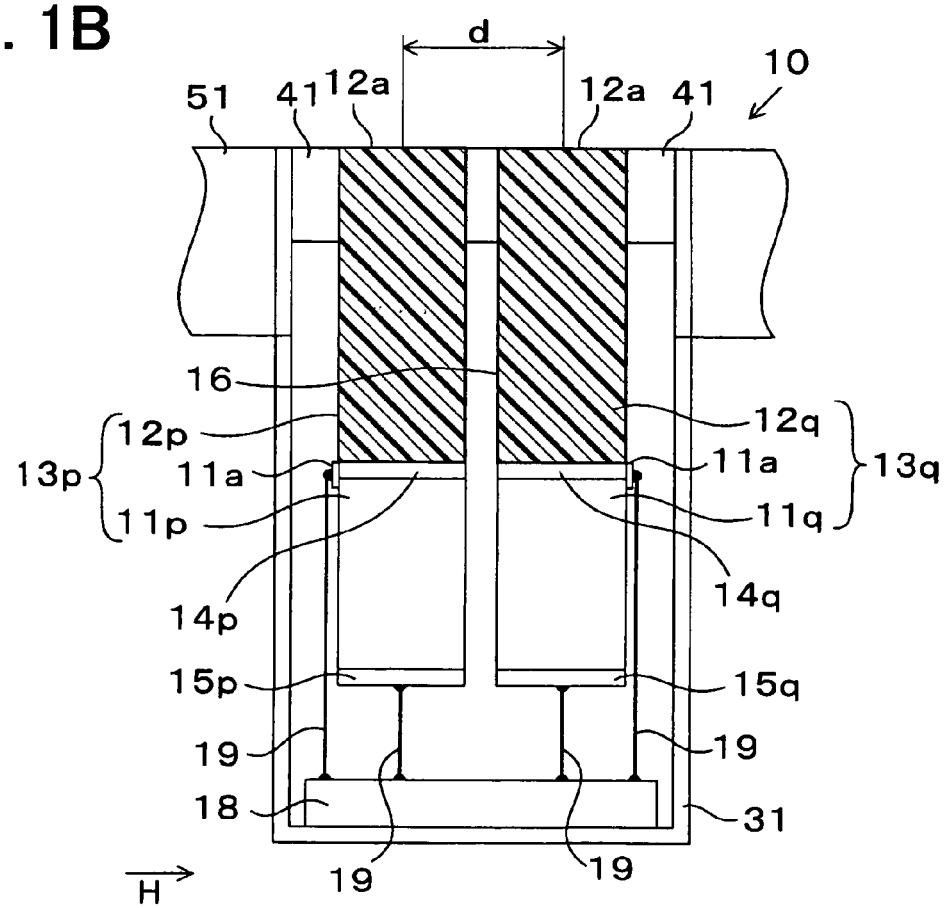
FIG. 1B is a schematic cross sectional diagram illustrating the ultrasonic sensor taken along line 1B-1B in FIG. 1A.

A configuration of the ultrasonic sensor is described below. As shown in FIGS. 1A and 1B, the ultrasonic sensor 10 includes a body 31, a circuit element 18, and multiple sensor elements 13$p$, 13$q$, 13$r$, 13$s$. The circuit element 18 and multiple sensor elements 13$p$, 13$q$, 13$r$, 13$s$ are disposed in the body 31. The multiple sensor elements 13$p$, 13$q$, 13$r$, 13$s$ are four elements arranged in an array so that each row in a longitudinal direction has two sensor elements, and each row in a lateral direction has two sensor elements. The circuit element 18 is electrically connected with the multiple sensor elements 13$p$, 13$q$, 13$r$, 13$s$. The circuit element 18 inputs and outputs a voltage signal, which is associated with transmitting and receiving an ultrasonic wave. The ultrasonic sensor 10 is mounted to a bumper 51 of the vehicle. The ultrasonic sensor 10 is configured to detect a location of an obstacle in a three-dimensional detection manner.

Since each sensor elements 13$p$, 13$q$, 13$r$, 13$s$ has a substantially same configuration, explanation is given below on one sensor element 13$p$. The sensor element 13$p$ includes a piezoelectric element 11$p$ for transmitting and receiving the ultrasonic wave. The sensor element 13$p$ further includes an acoustic matching member 12$p$, which is joined with the piezoelectric element 11$p$. The acoustic matching member 12$p$ conducts the ultrasonic wave oscillated by the piezoelectric element 11$p$, and send the ultrasonic wave in a forward direction of the vehicle. The acoustic matching member 12$p$ receives the ultrasonic wave reflected by an obstacle, and conducts vibrations to the piezoelectric element 11$p$. That is, each sensor element 13$p$, 13$q$, 13$r$, 13$s$ is capable of transmitting and receiving the ultrasonic wave, and function as a transmission element and a reception element.

The piezoelectric element 11$p$ is made of, for example, lead zirconium titanate (PZT). The piezoelectric element 11$p$ includes a piezoelectric member, which has a substantially quadratic prism shape. A cross section of the piezoelectric member is substantially similar to that of the acoustic matching member 12$p$ in shape. A pair of electrodes is disposed on surfaces of the piezoelectric member, the surfaces which are opposed to each other. The pair of electrodes is formed by Pt or Cu sputtering, plating, conductive paste printing, or the like. One of the electrodes located on an acoustic matching member 12p side is referred to as a first electrode 14p. The other of the electrodes opposed to the first electrode is referred to as a second electrode 15p.

A line element 11a is located on a side of the piezoelectric element 11p. The line element 11a is electrically connected with the first electrode 14p. The first electrode 14p of the piezoelectric element 11p is electrically connected with the circuit element 18 through a wire 19, which has electrical connection with the line element 11a. The second electrode 15p of the piezoelectric element 11p is electrically connected with the circuit element 18 through the wire 19.

An acoustic impedance of the acoustic matching member 12p is larger than that of air and smaller than that of the piezoelectric element 11p. The acoustic matching member 12p is made of resin having high durability such as polycarbonate resin. The acoustic matching members 12p to 12s are arranged so that a distance "d" between the centers of the adjacent acoustic matching members is approximately equal to half of the wavelength of the ultrasonic wave. The acoustic matching members 12p to 12s are fixed in an opening of the body 31. A vibration damping member 41 is located between side surfaces of the acoustic matching members 12p to 12s so that the vibration damping member 41 is proximal to a transmission reception surface 12a of the acoustic matching member 12p to 12s. The vibration damping member 41 is also located between an inner wall of the opening of the body 31 and each acoustic matching member 12p to 12s so that the vibration damping member 41 is proximal to a transmission reception surface 12a. The vibration damping member 41 effectively prevents ultrasonic wave from conducting therethrough.

The acoustic matching member 12p is formed so that: a width W of the acoustic matching member 12p is less than or equal to half of the wavelength of ultrasonic wave measured in air; a thickness is approximately equal to one-quarter of the wavelength of the ultrasonic wave measured in the acoustic matching member 12p. The thickness with approximately one-quarter of the ultrasonic wave causes generation of a standing wave in the acoustic matching member 12p. Thereby, it is possible to restrict interference and resultant cancellation of the following ultrasonic waves; one is the wave that impinges in the acoustic matching member 12p; and the other is the wave that is reflected at a boundary between the acoustic matching member 12p and the piezoelectric element 11p. Thus, the acoustic matching member 12p can efficiently conduct the ultrasonic wave to the piezoelectric element 11p.

The circuit element 18 is electrically connected with an electronic control unit (ECU; not shown) mounted to a vehicle. The ECU outputs a control signal for controlling a sound pressure and a phase of the ultrasonic wave to be oscillated by the ultrasonic sensor 10. Based on the controls signal, the circuit element 18 outputs a voltage signal to the piezoelectric element 11p so that the piezoelectric element 11p oscillates the ultrasonic wave. When the ultrasonic wave is received, the piezoelectric element 11p outputs to the circuit element 18 a voltage signal which depends on a sound pressure and a phase of the received ultrasonic wave. Based on the voltage signal input from the piezoelectric element 11p, the circuit element 18 performs an arithmetic processing and outputs a vibration signal to the ECU.

Explanation on obstacle detection is given below with reference to an exemplary case where the ultrasonic wave is transmitted from the sensor element 13p. The ECU outputs the control signal for controlling the sound pressure and the phase of the ultrasonic wave to be transmitted. The circuit element 18 outputs the voltage signal to the piezoelectric element 11p based on the control signal output from the ECU. The piezoelectric element 11p vibrates in accordance with the voltage signal, and thereby the piezoelectric element 11p oscillates the ultrasonic wave with a given sound pressure and a given phase. The ultrasonic wave oscillated by the piezoelectric element 11p is conducted to the acoustic matching member 12p, and is sent outside from the transmission reception surface 12a of the acoustic matching member 12p. The ultrasonic wave transmitted from the transmission reception surface 12a may be reflected by an obstacle. The reflected ultrasonic wave is received by the transmission reception surface 12a of the acoustic matching member 12p. The ultrasonic wave received by the transmission reception surface 12a is conducted to the piezoelectric element 11p through the acoustic matching member 12p. The ultrasonic wave conducted to the piezoelectric element 11p is sensed by the piezoelectric element 11p, and converted into the voltage signal. The voltage signal output from the piezoelectric element 11p is input to the ECU via the circuit element 18. The circuit element 18 performs the arithmetic processing based on the voltage signal from the piezoelectric element 11p.

Since the sensor elements 13p to 13s are arranged in an array, it is possible to measure, for example, a location of the obstacle by obtaining a difference in time or phase between the ultrasonic wave received with one sensor element and that received with another sensor element. The vibration damping member 41 is located between the sensor elements 13p to 13s. Thus, the ultrasonic wave is individually conducted in each sensor element 13p to 13s, and is individually detected in each sensor element 13p to 13s. It is therefore possible to provide the ultrasonic sensor with a favorable crosstalk characteristic. It is possible to improve detection sensitivity for ultrasonic wave. The sensor elements 13p to 13s are arranged so that the distance "d" between the centers of the adjacent acoustic matching members 12p to 12s is approximately equal to half of the wavelength of the ultrasonic wave. Thus, it is possible to detect an incident angle of the received ultrasonic wave based on a difference in phase between those received by adjacent acoustic matching members 12p to 12s. Since it is possible to detect the incident angle of the ultrasonic wave with high accuracy, it is possible to improve measurement accuracy of a distance to the obstacle and a location of the obstacle.

A method for controlling a directivity of the ultrasonic wave is explained below. A directivity of ultrasonic wave is associated with a detection area D. The detection area D is expressed as, for example, an area where the sound pressure of the ultrasonic wave is approximately more than 0.7 times as large as that just proximal to the center of the transmission reception surface 12a. The detection area D can be defined by a detection range L and a directivity θ. The detection range L is a distance from the center of the transmission reception surface 12a. The directivity θ is an angle to an axis that is normal to the transmission reception surface 12a. The detection range L is associated with pressure attenuation of the ultrasonic wave. The directivity θ is associated with spread of the ultrasonic wave.

The detection range L depends on an area of the transmission reception surface 12a. The directivity θ depends on a length of a side of the transmission reception surface 12a when the transmission reception surface 12a is assumed to be a quadrangular shape. In the followings, it is assumed that the transmission reception surface 12a have a square shape.

Figure 2A:
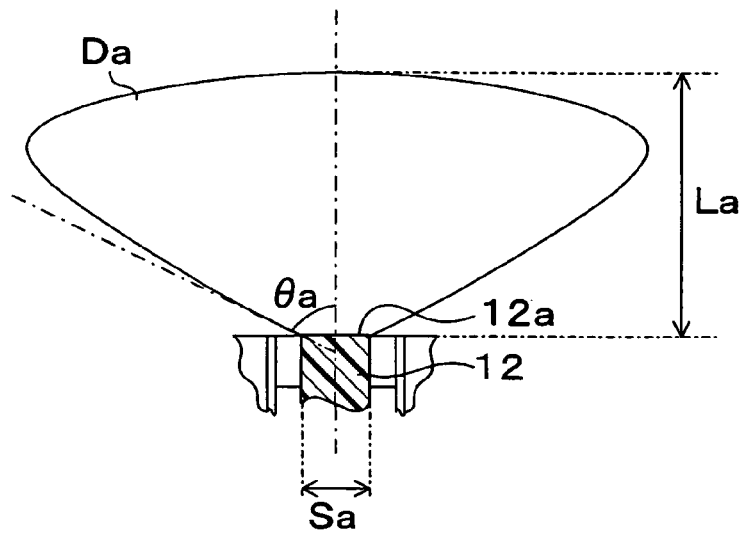
FIGS. 2A and 2B are schematic diagrams for explaining control of a directivity of an ultrasonic wave.
Figure 2B:
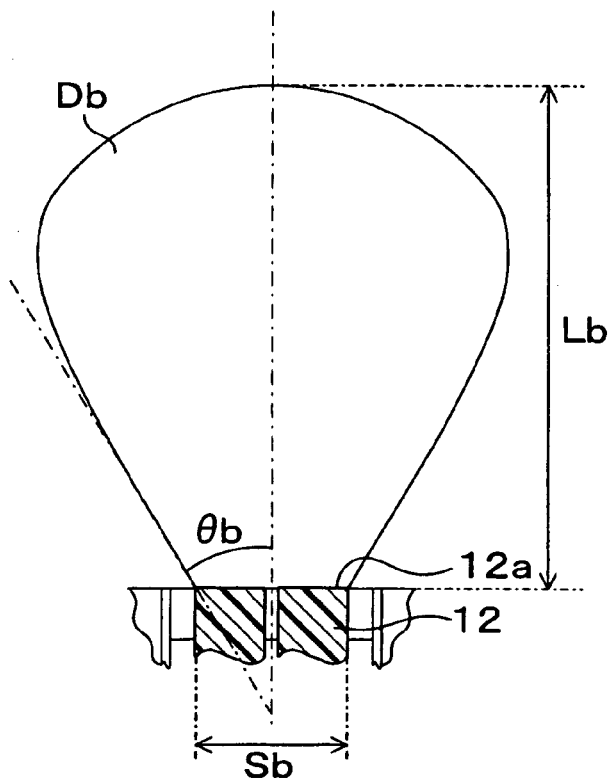

FIG. 2A illustrates the directivity of the ultrasonic wave for a case where the side of the transmission reception surface 12a has the length Sa. FIG. 2B illustrates the directivity of the ultrasonic wave for a case where the side of the transmission reception surface 12a has the length Sb. In the above cases, the length Sa is smaller than Sb (i.e., Sa<Sb). When the side of the transmission reception surface 12a has the length Sa, the ultrasonic wave has the detection area Da. When the side of the transmission reception surface 12a has the length Sb, the ultrasonic wave has the detection area Db. When the above two cases are compared, the directivity θ is larger than the directivity θb. As the side of the transmission reception surface 12a has a smaller length, the directivity θ is larger. The detection range La is smaller than Lb (La<Lb). As the side of the transmission reception surface 12a has a larger length, the detection range L is larger.

As the area of the transmission reception surface 12a is larger, the sound pressure of the ultrasonic wave is larger, and spread of the ultrasonic wave is smaller. That is, when the area of the transmission reception surface 12a decreases, it becomes difficult to detect an obstacle that is distant from the vehicle but it is possible to broaden the detection area. When the area of the transmission reception surface 12a increases, the detection area is narrowed but it is possible to detect the obstacle that is distant from the vehicle.

Figure 3:
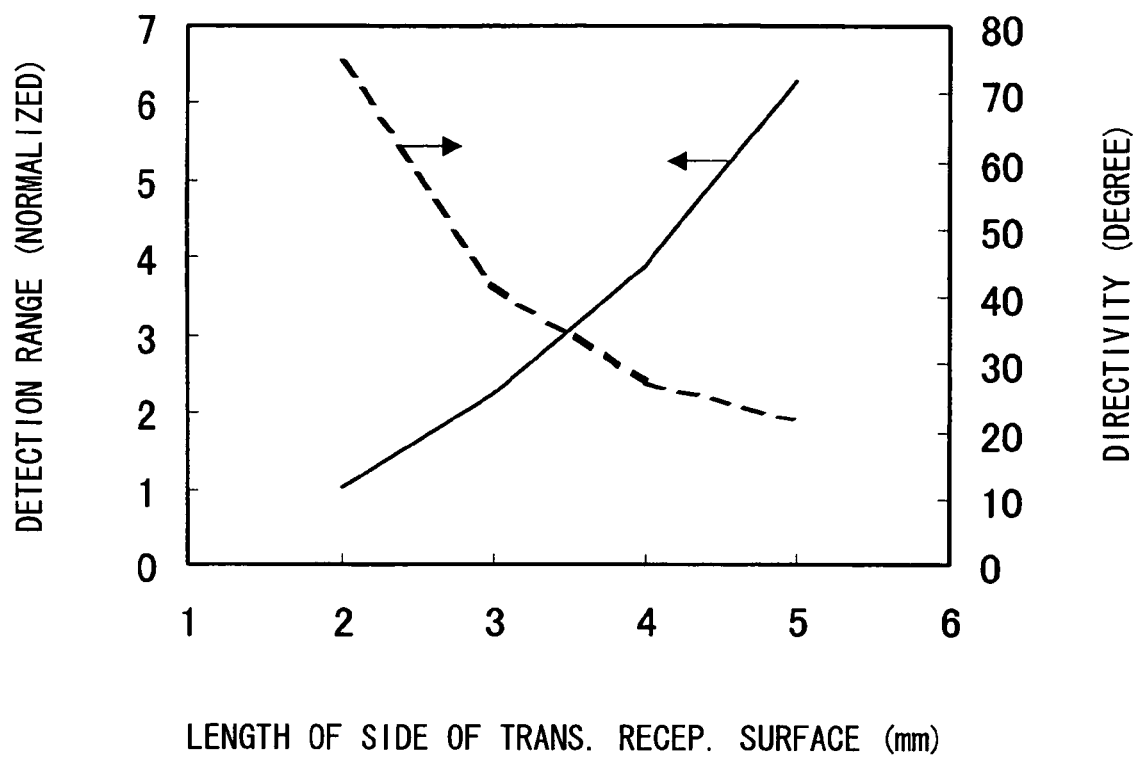
FIG. 3 is a graph illustrating a detection range and a directivity of an ultrasonic wave as a function of a size of a transmission surface of a sensor element.

FIG. 3 is a graph schematically illustrating the detection range and the directivity as a function of the length of the side of the transmission reception surface 12a. In the graph, the vertical scale is normalized by the detection range for the case of the side 2 mm. When the sensor element 13p having the transmission reception surface 12a with the side 5 mm is compared to that with the side 2 mm, the sensor element 13p having the surface 12a with the side 5 mm provides the considerably-larger detection range than that with the side 2 mm provides. The detection range of the sensor element 13p with the side 5 mm is roughly more than six times as large as that with the side 2 mm. The sensor element 13p having the transmission reception surface 12a with the side 2 mm has the directivity of roughly 75 degree while that with the side 5 mm has a smaller directivity of roughly 20 degree.

Figure 4A:
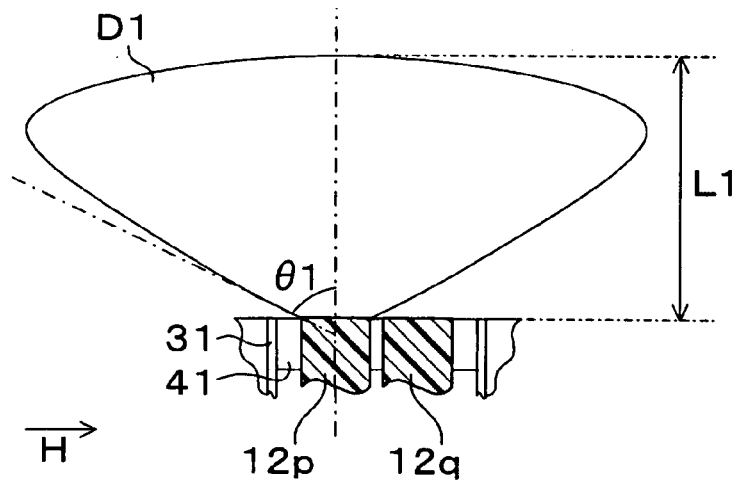
FIGS. 4A and 4B are schematic diagrams for explaining a directivity of an ultrasonic wave in a case where the ultrasonic wave is transmitted from only one sensor element.
Figure 4B:
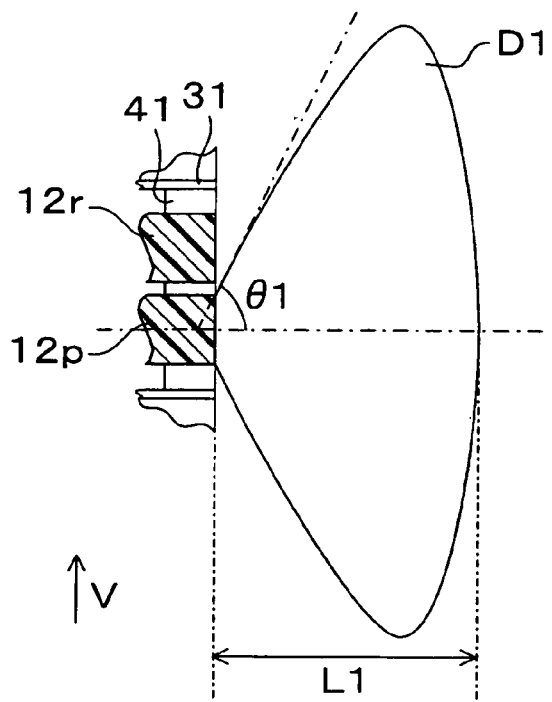
Figure 5A:
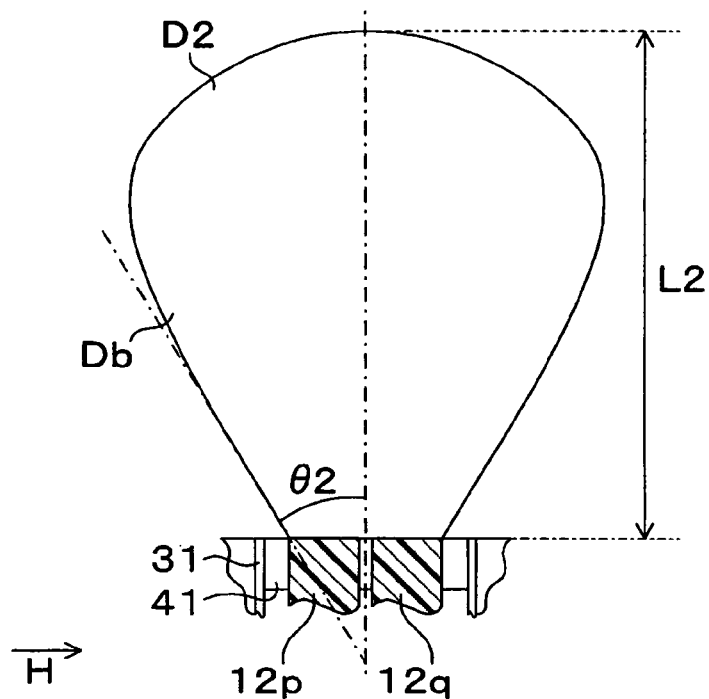
FIGS. 5A and 5B are schematic diagrams for explaining a directivity of an ultrasonic sensor in a case where the ultrasonic wave is transmitted from four sensor elements.
Figure 5B:
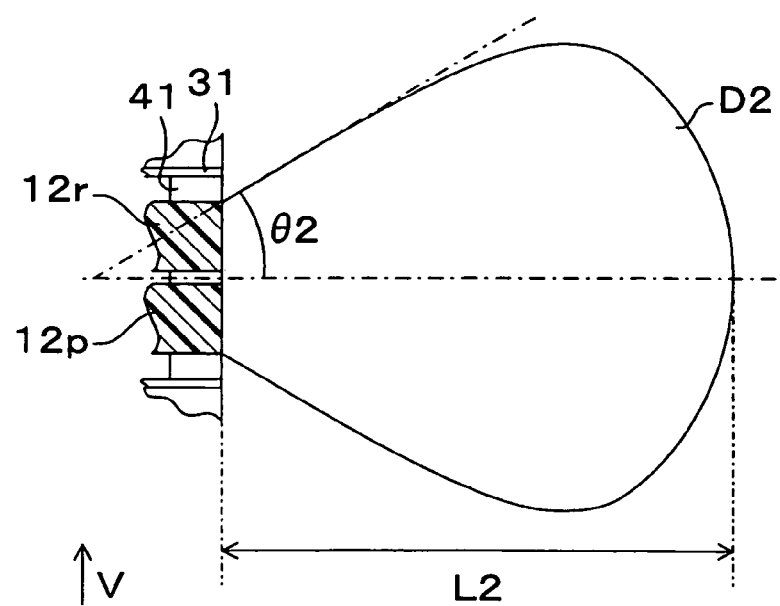
Figure 6A:
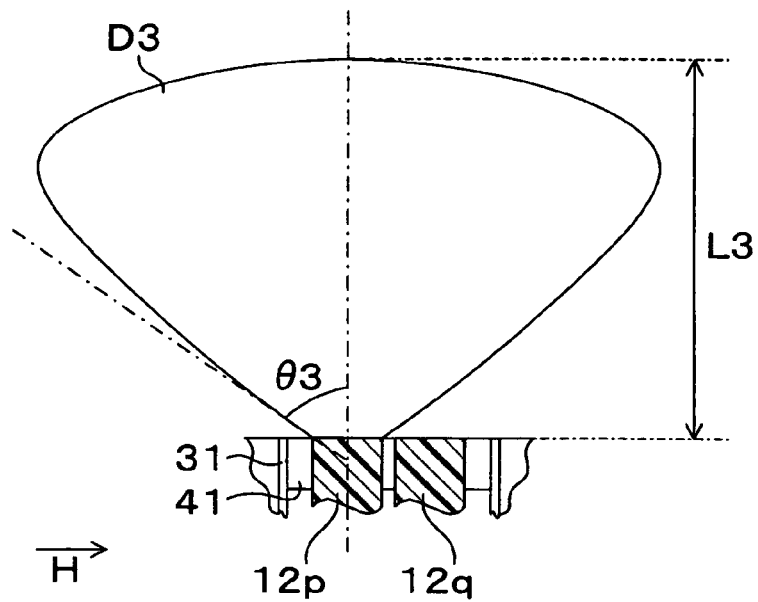
FIGS. 6A and 6B are schematic diagrams for explaining a directivity of an ultrasonic sensor in a case where the ultrasonic wave is transmitted from two sensor elements arranged in a vertical direction, which is perpendicular to a ground.
Figure 6B:
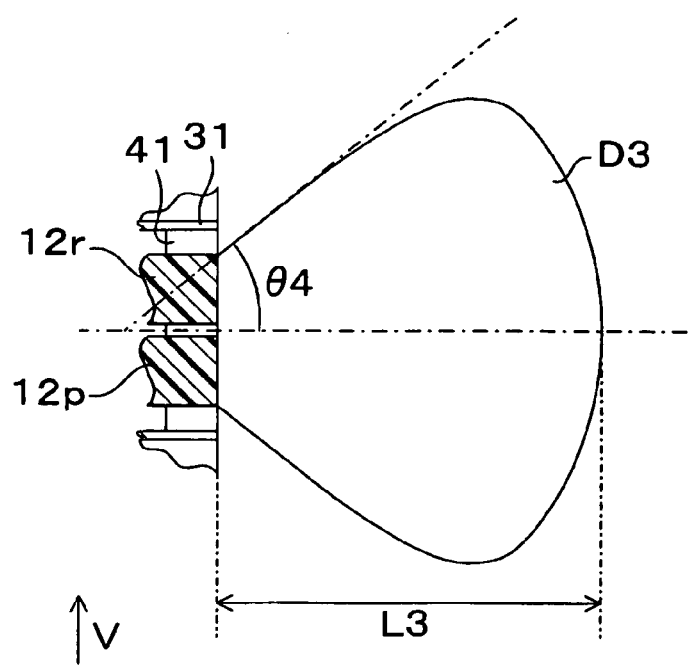

Exemplary control patterns of the directivity of the ultrasonic waves are described below. FIGS. 4A and 4B are explanatory diagrams illustrating a case where the ultrasonic wave is transmitted from only the sensor element 13p. FIG. 4A is a schematic diagram illustrating the directivity of the ultrasonic wave viewed along the V direction from lower to upper. FIG. 4B is a schematic diagram illustrating the directivity of the ultrasonic wave viewed along the H direction. FIGS. 5A and 5B are equal to FIGS. 4A and 4B in respect of the view directions, respectively. Also, FIGS. 6A and 6B are equal to FIGS. 4A and 4B in respect of the view direction, respectively. The detection area of the ultrasonic wave transmitted from only the sensor element 13p is denoted by D1, which is substantially isotopic in the V direction and the H direction. The directivity and the detection range of the detection area D1 are, respectively, denoted by θ1 and L1. The side of the transmission reception surface 12a has the length S1.

Explanation is given below on the directivity of the ultrasonic wave for a case where the ultrasonic wave is transmitted from all of the sensor elements 13p to 13s. As shown in FIGS. 5A and 5B, in transmitting the in-phase ultrasonic wave from the sensor element 13p to 13s, the acoustic matching members 12p to 12s vibrate in an integrated manner. This is because the vibration damping member 41 located between the sensor elements 13p to 13s has a low elasticity and because the vibration damping member 41 does not restrict vibrations of the acoustic matching members 12p to 12s. A vibration state of the transmission reception surfaces of the ultrasonic sensor 10 in the above case is substantially equivalent to a state where the ultrasonic wave is transmitted from a square-shaped transmission reception surface having a side that is twice as large as the side S1. It should be noted that the above described "in-phase" includes not only "completely in-phase" but also includes a phase range where the transmission reception surfaces 12a of the acoustic matching members 12p to 12s vibrate in an integrated manner.

An effect in the above case is substantially identical to that in a case where each side of the transmission reception surface 12a becomes longer. Therefore, the detection area D2 is substantially isotropic in the V direction and the H direction. Further, the directivity θ2 is smaller than θ1, and the detection range L2 is longer than L1. That is, according to the above method for transmitting the ultrasonic wave, although the detection area is narrowed, it is possible to detect an obstacle that is distant from the vehicle.

It is possible to switch the number of the sensor elements 13p to 13s which transmit the ultrasonic wave. Thereby, it is possible to transmit the ultrasonic wave while the directivity of the ultrasonic wave is switched. The ultrasonic wave having the detection area D1 (cf. FIGS. 4A and 4B) and that having the detection area D2 (cf. FIGS. 5A and 5B) can be alternately transmitted at given time intervals. In alternately transmitting, when the ultrasonic wave having the detection area D1 is transmitted, it is possible to detect an obstacle in a wide area around the vehicle. When the ultrasonic wave having the detection area D2 is transmitted, it is possible to detect an obstacle that is distant from the vehicle. According to the above manners, it is possible to detect an obstacle in a broader area by switching the directivity of the ultrasonic wave using single ultrasonic sensor 10. Thereby, it is possible to reduce a blind spot of the obstacle sensor of the vehicle for instance.

Explanation is given below on the directivity of the ultrasonic sensor for a case where two sensor elements 13p, 13r arranged along the V direction are selected to transmit the ultrasonic wave. When the in-phase ultrasonic wave is transmitted from the sensor elements 13p, 13r, the transmission reception surfaces of the ultrasonic sensor 10 have a vibration state that is substantially equivalent to the followings. The ultrasonic wave is transmitted from such a rectangular shaped transmission reception surface that: one side of the transmission reception surface in the H direction has a length S1; and another side in the V direction has a length approximately twice as large as the S1.

As shown in FIGS. 6A and 6B, the detection area D3 is anisotropic between in the V direction and in the H direction. Accordingly, the ultrasonic wave spreads differently between in the V direction and in the H direction. Since the side in the V direction effectively becomes longer, the directivity θ3 in the V direction becomes smaller than the directivity θ1. Since the side in the H direction becomes shorter compared to a case where the sensor elements 13p to 13s transmit the ultrasonic wave, the directivity θ4 in the H direction is smaller than the directivity θ2. Since the side in the V direction is longer than the side in the H direction, the directivity θ3 is larger than the directivity θ4. That is, the above directivities have a relation expressed as: $\theta 1 \cong \theta 3 > \theta 4 \cong \theta 2$. Further, an area of an equivalent transmission reception surface is smaller than that in a case where the sensor elements 13p to 13s transmit the ultrasonic wave. The detection range L3 is larger than L1 and smaller than L2. That is, the detection ranges has a relation expressed as: $L2 > L3 > L1$.

Regarding the detection area D3, the directivity in the V direction (cf. FIG. 6B) is narrowed while the directivity in the H direction (cf. FIG. 6A) is retained. Thus, when influence of reflection from the ground is potentially large (e.g., in a case where the vehicle travels on a rough road), it is possible to substantially exclude the influence of reflection from the ground.

The ultrasonic wave having the detection area D1 (cf. FIGS. 4A, 4B) and that having the detection area D3 are alternately transmitted at predetermined time intervals. In alternately transmitting, when the ultrasonic wave having the detection area D1 is transmitted, it is possible to detect an obstacle in a wide area around the vehicle. When the ultrasonic wave having the detection area D3 is transmitted, it is possible to detect an obstacle that is distant and outside of the detection area D1 with high accuracy while the influence of reflection at the ground is substantially being excluded.

Figure 7A:
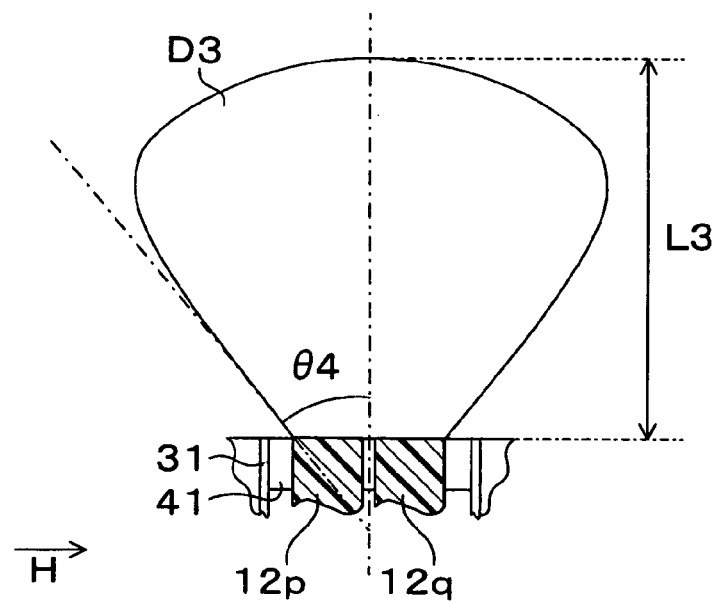
FIGS. 7A and 7B are schematic diagrams for explaining a directivity of an ultrasonic sensor in a case where the ultrasonic wave is transmitted from another two sensor elements arranged in a horizontal direction, which is parallel to the ground.
Figure 7B:
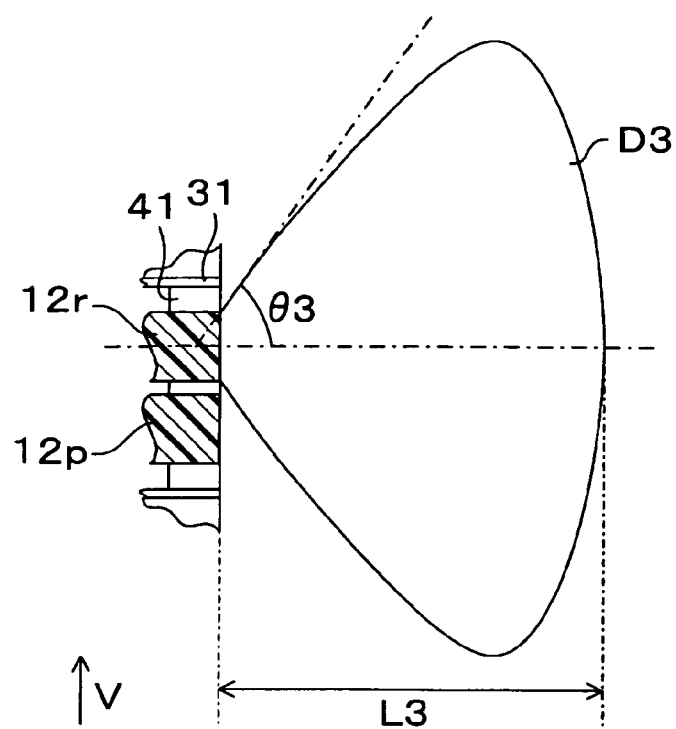

Another pair of two sensor elements 13p, 13q can be selected to transmit the ultrasonic wave. The another pair of two sensor elements 13p, 13q are arranged in a line parallel to the ground (i.e., in the H direction). As shown in FIGS. 7A and 7B, the directivity of the ultrasonic wave according to the above arrangement is substantially equal to 90 degree-rotated directivity of the detection area D3 illustrated in FIGS. 6A and 6B, wherein the rotation is made about the transmission direction of the ultrasonic wave. According to the above manners, it is possible to narrow the directivity in the H direction.

The ultrasonic wave having the detection area D2 (cf. FIGS. 5A, 5B) and the ultrasonic wave illustrated in FIGS. 7A and 7B can be alternately transmitted at predetermined time intervals. In alternately transmitting, when the ultrasonic wave having the detection area D2 is transmitted, it is possible to detect an obstacle exiting along a traveling direction of the vehicle. When the ultrasonic wave shown as illustrated in FIGS. 7A, 7B is transmitted, it is possible to detect an obstacle on a road such as a curb and a groove, since the ultrasonic wave as illustrated in FIGS. 7A and 7B has a wider detection area in the V direction.

Figure 8A:
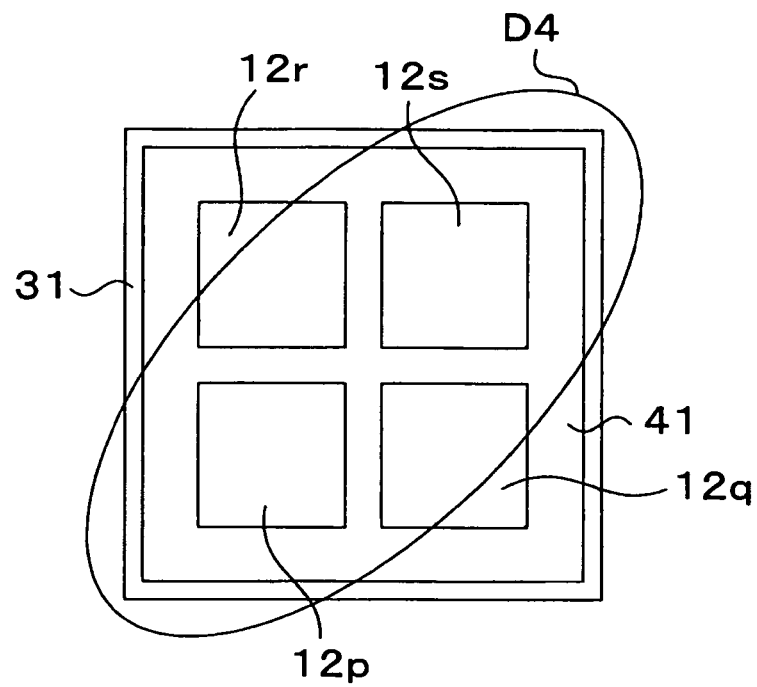
FIGS. 8A and 8B are schematic diagrams for explaining a directivity of an ultrasonic sensor in a case where the ultrasonic wave is transmitted from sensor elements asymmetrically arranged in the vertical direction and the horizontal direction.
Figure 8B:
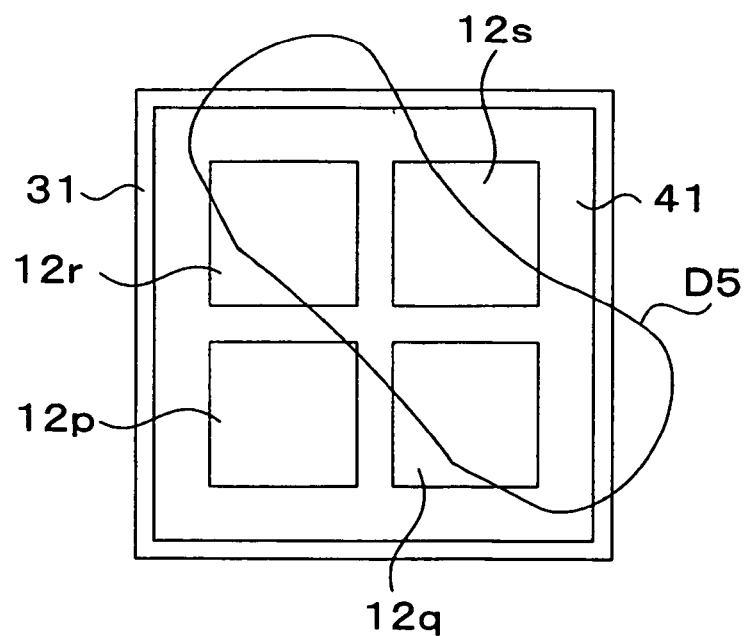

For ultrasonic wave transmission, another combination of sensor elements can be selected from among the sensor elements 13p to 13s so that the selected sensor elements are asymmetrically arranged between in the H direction and in the V direction. For example, as shown in FIG. 8A, when the ultrasonic wave is transmitted from the sensor elements 13q, 13r, the transmitted ultrasonic wave has a detection area D4. The detection area D4 has a flat shape and is inclined at 45 degree to the ground. Alternatively, as shown in FIG. 8B, when the ultrasonic wave is transmitted from the sensor elements 13q, 13r, 13s, the transmitted ultrasonic wave has a detection area D5, which has a roughly rectangular shape. When a surrounding environment is noisy, it is possible to improve robustness by comparing between a reception signal for a case in transmitting the ultrasonic wave having the biased directivities and that for a case in transmitting the ultrasonic wave (e.g., D1, D2, D3) with the other directivities.

It is possible to transmit the ultrasonic wave while combination of the selected sensor elements is switching. It is thereby possible to specify a direction toward an obstacle. It is arbitrary to combine the directivities according to a target object and a detection purpose.

In the above embodiments, the piezoelectric element is used as a transmission element for transmitting the ultrasonic wave. Alternatively, another element may be used as the transmission element. For example, a thermal excitation typed transmission element may be used. Alternatively, another transmission may be used, which includes a membrane formed in a semiconductor substrate by MEMS technique.

In the above embodiments, each sensor element 13p to 13s is configured to be capable of transmitting and receiving the ultrasonic wave. Alternatively, each sensor element 13p to 13s may be configured to only transmit the ultrasonic wave, and the ultrasonic sensor may further includes a reception element for receiving ultrasonic wave.

The ultrasonic sensor may include the arbitrary number of sensor elements according to application. For example, two sensor elements may be prepared for two-dimensional detection. Alternatively, sensor elements may be arranged in an array so that each row along a predetermined direction has the larger number of sensor elements. More specifically, six sensor elements may be arranged in an array so that each row along a longitudinal direction has three sensor elements and each row along a lateral direction has two sensor elements.

In the above embodiments, the ultrasonic sensor 10 is used as an obstacle detection sensor mounted to a vehicle according to an exemplary use. Alternatively, the method and apparatus according to the present embodiments may be applied to, for example, a sensor for industrial use, for a nursing care use, for a household use, or the like.

According to the method and the apparatus for transmitting ultrasonic wave illustrated in the present embodiments, at least two adjacent sensor elements are selected or combined from among the sensor elements 13p to 13s. The ultrasonic wave is transmitted in such a manner that the transmission reception surfaces 12a of the combined sensor elements integrally vibrate so as to have in-phase vibrations. Since the transmission reception surfaces 12a of the selected or combined sensor elements integrally vibrate so as to have in-phase vibrations, it is possible to provide the selected sensor elements with an effective vibration state where transmission reception surface 12a effectively increases. Thus, it is possible to transmit variety of the ultrasonic wave that is different in the detection area (e.g., directivity) from the ultrasonic wave transmitted from single sensor element. Therefore, when combination of the sensor elements for ultrasonic wave transmission is switched, the detection area (e.g., directivity) of the ultrasonic wave is changed. It is possible to realize a method for transmitting the ultrasonic wave, the method providing high flexibility of detection area control (e.g., directivity control) of the ultrasonic wave. It is possible to switch detection areas even when the number of sensor elements is small. It is therefore possible to reduce a size of the ultrasonic sensor 10.

According to the above embodiments, the transmission reception surfaces 12a of the sensor elements 13p to 13s are arranged in an array along the H direction and the V direction. The method for transmitting the ultrasonic wave according to the above embodiments can be applied to an ultrasonic sensor having sensor element arranged in similar manner to that according to the ultrasonic sensor 10. In the above case, it is possible to control the directivity of the ultrasonic wave in the H direction and the V direction. Therefore, the method for transmitting the ultrasonic wave may suitably be used in an ultrasonic sensor that is mounted to a vehicle, and that detects an obstacle exiting around the vehicle.

In the ultrasonic sensor 10, since each sensor elements 13p to 13s has the acoustic matching members 12p to 12s, it is possible to transmit and send the ultrasonic wave oscillated by each piezoelectric element 11p to 11s. Further, the vibration damping member 41 is located between the sensor elements 13p to 13s around the transmission reception surface 12a of each sensor element 13p to 13s. Since the vibration damping member 41 has a low elasticity, the vibration damping member 41 does not restrict vibrations of the acoustic matching members 12p to 12s. The transmission reception surfaces 12a can integrally vibrate in an efficient manner.

The two sensor elements 13p, 13r, which are arranged along a direction perpendicular to the ground, can be selected from among the multiple sensor elements 13p to 13s. In transmitting the ultrasonic wave from the above elements 13p, 13r, a realized vibration state of the elements 13p, 13r is substantially equivalent to such a state that the transmission reception surface 12a effectively has a longer side in the V direction. Thus, it is possible to narrow the directivity of the detection area D3 in the V direction while the directivity in the H direction is retained. Therefore, when the ultrasonic sensor 10 operates in an environment where the influence of reflection of ultrasonic wave at the ground is potentially large (e.g., the vehicle travels on a rough road), it is possible to efficiently exclude the influence.

Another pair of sensor elements 13p, 13r, which are arranged along the horizontal direction, can be selected from among the multiple sensor elements 13p to 13s. In transmitting the ultrasonic wave from the above elements 13p, 13r, a realized vibration state is substantially equivalent to such a state that the transmission reception surface 12a effectively has a longer side in the H direction. Thus, it is possible to narrow the directivity in the H direction while the directivity in the V direction is retained. Therefore, transmitting such ultrasonic wave may be preferable when detection is made for an obstacle on a road such as a curb and a groove.

A combination of sensor elements, which are asymmetrically arranged between in the horizontal and vertical directions, can be selected from among the multiple sensor elements 13p to 13s. In the above arrangement, it is possible to transmit the ultrasonic wave with a biased directivity. When a surrounding environment is noisy, it is possible to improve robustness in the following manners. The ultrasonic waves with the biased directivity and another directivity are transmitted, and comparison is made between the reception signal of the ultrasonic wave with the biased directivity and that with another directivity.

It is possible to transmit the ultrasonic wave while the directivity thereof is switched in the following manners: the number of sensor elements which transmit ultrasonic wave is switched; combination of the selected sensor elements which transmit the ultrasonic wave is switched. According to the above manners, it is possible to detect an object while the directivity is switched to reduce a blind spot associated with a detection area. According to the above manners, it is possible to perform an obstacle detection operation in accordance with a type of a target detection object and a location of the target detection object. For example, it is possible to alternately transmit the ultrasonic wave having the first detection area D1 from the sensor element 13p and that having the second detection area D2 from the sensor elements 13p to 13s at given time intervals. In alternately transmitting, when the ultrasonic wave having the detection area D1 is transmitted, it is possible to search for an obstacle in a wide area around the vehicle. When the ultrasonic wave having the detection area D2 is transmitted, it is possible to search for an obstacle located distant from the vehicle. Accordingly, the above alternate transmission enables to sense an obstacle in a larger area.

Each sensor element 13p to 13s also functions as a reception element for receiving the ultrasonic wave. That is, the transmission element and the reception element are integrated together. Therefore, it is possible to downsize the ultrasonic sensor 10.

Modified Embodiments (First Modification)

It is also possible to control a direction of a main probe by phase-shifting the transmitting ultrasonic wave in a range where the transmission reception surfaces 12a of the acoustic matching members 12p to 12s integrally vibrate. For example, it is possible to incline the detection range D3 upward in the following manners. The two sensor elements 13p, 13s arranged in the V direction are selected from among the multiple sensor elements 13p to 13s. The sensor element 13r outputs the ultrasonic wave more intensive than the sensor element 13p does.

(Second Modification)

When combination of the sensor elements which transmit the ultrasonic wave is switched, it is possible to alternately transmit the ultrasonic wave with the directivity thereof being retained. For example, it is possible to alternately transmit the ultrasonic waves by alternately selecting combination of the sensor elements 13p, 13r and combination of the sensor element 13q, 13s. According to the above manners, each sensor element has a period when the sensor element does not operate. Thus, it is possible to restrict an increase in temperature of the sensor element due to heat generated by an operation of the sensor element. It is possible to therefore decrease intervals of ultrasonic wave transmission and enable stable transmission. Moreover, the multiple sensor elements may be configured to alternately transmit the ultrasonic wave only when an obstacle that had detected at a large distance approaches the vehicle closely. Thereby, it is possible to improve a system associated with the ultrasonic sensor in respect of response.

(Third Modification)

The multiple transmission elements for transmitting ultrasonic wave may not be configured to receive and sense the ultrasonic wave. The ultrasonic sensor may include a reception element that does not transmit the ultrasonic wave but receives and senses the ultrasonic wave. For example, when the ultrasonic wave having the detection area D3 is transmitted using the sensor elements 13p and 13r, only the sensor elements 13q and 13s receive the ultrasonic wave reflected by an obstacle. When the ultrasonic wave is transmitted and received by the same sensor element in a case where an obstacle is located proximal to the ultrasonic sensor 10, reverberation in the acoustic matching member may cause error. However, according to the above manners, the sensor element that transmits ultrasonic wave is configured not to receive the ultrasonic wave. Therefore, it is possible to detect a nearby obstacle with high accuracy. Multiple sensor elements may be configured to alternately transmit the ultrasonic wave only when an obstacle that had detected at a large distance approach the vehicle closely. Thereby, it is possible to improve a system associated with the ultrasonic sensor in respect of response.

(Fourth Modification)

Figure 9:
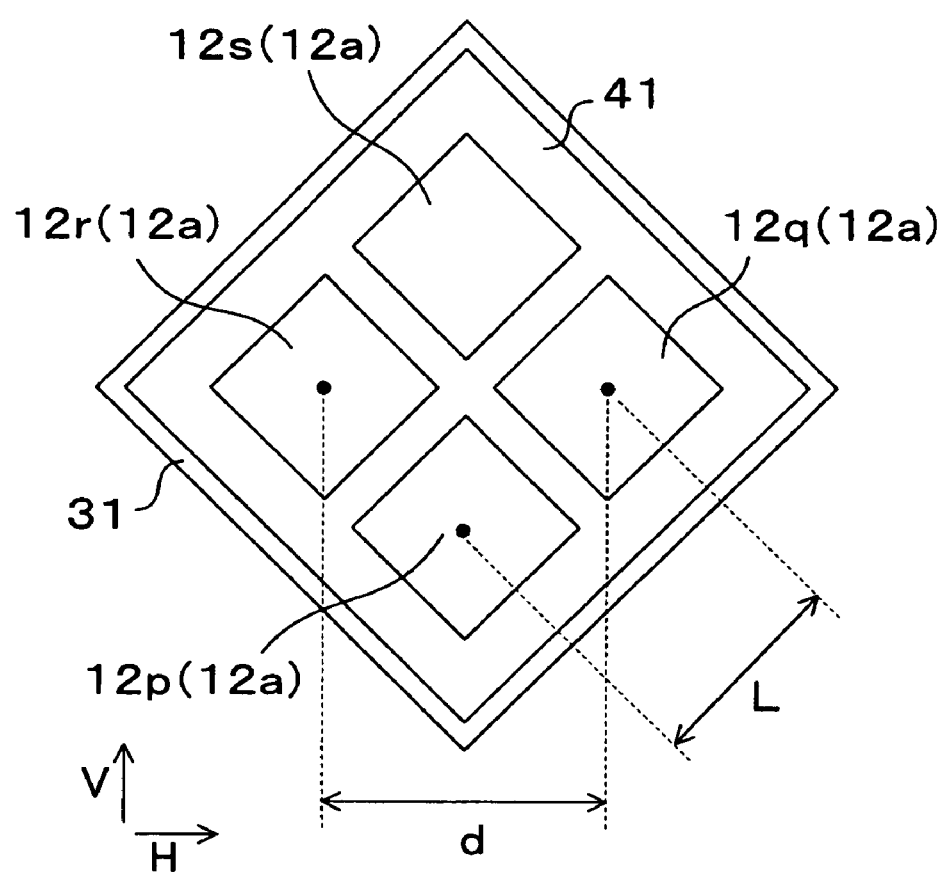
FIG. 9 is a plan view diagram illustrating another ultrasonic sensor having another arrangement of sensor elements.

Adjacent transmission reception surfaces of the acoustic matching members 12p to 12s may be arranged in a line inclined at about 45 degree to a direction substantially perpendicular to the ground. In the above arrangement, as shown in FIG. 9, the acoustic matching members 12r and 12q arranged in the horizontal direction have a distance "d" therebetween. Also, the acoustic matching members 12p and 12s arranged in the vertical direction have the distance "d" therebetween. The acoustic matching members 12p to 12s are arranged so that the distance "d" is approximately equal to half of the wave length of the ultrasonic wave. In the above case, the centers of the transmission reception surfaces 12a of the adjacent acoustic matching members (e.g., the acoustic matching members 12p and 12q) have a distance L therebetween. The distance L is approximately ($\frac{1}{2}$)$\sqrt{2}$ times as large as the wavelength of the ultrasonic wave. Therefore, an area of each transmission reception surface 12a in the above arrangement can be smaller than that in the arrangement shown in FIG. 1. That is, it is possible to downsize the ultrasonic sensor 10 while a distance between transmission reception surfaces in the vertical direction or the horizontal direction is being maintained. It is therefore possible to, for example, reduce an area exposed to outside of the ultrasonic sensor 10 to one-half as large as that in the arrangement shown in FIG. 1.

(Fifth Modification)

It is possible to reduce vibration noise by performing an active noise control (ANC). In the ANC, a sensor element that is not transmitting the ultrasonic wave is oscillated in opposite phase compared to the transmitting ultrasonic wave. In the ANC, it is possible to reduce reverberation in the sensor element which functions as both the transmission element and the reception element.

(Sixth Modification)

For controlling the detection area by combining some elements from among multiple transmission elements, the number of sensor elements which are capable of transmitting ultrasonic wave is arbitrary in the ultrasonic sensor.

(Seventh Modification)

The ultrasonic sensor can decrease in a blind spot and increase in a detection range by switching combination of transmission elements. Therefore, the ultrasonic sensor may be suitably used in a system for monitoring an area around a vehicle, a system for monitoring a robot, or the like.

While the invention has been described with reference to preferred embodiments thereof, it is to be understood that the invention is not limited to the preferred embodiments and construction. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for transmitting an ultrasonic wave by using an ultrasonic sensor including a plurality of transmission elements each having a transmission surface for ultrasonic wave transmission, the plurality of transmission surfaces being arranged in an array, the ultrasonic sensor further including a reception element for receiving and sensing the ultrasonic wave reflected by an object, the method comprising:

selecting a first combination of transmission elements from among the plurality of transmission elements so that the first combination of transmission elements includes at least two transmission elements adjacent to each other, wherein the ultrasonic sensor is mounted to a vehicle and configured to sense an object existing around the vehicle, the transmission surfaces of the plurality of transmission elements are arranged to form a horizontal row and a vertical row, the horizontal row is parallel to a horizontal direction, which is substantially parallel to a ground, and the vertical row is parallel to a vertical direction, which is substantially perpendicular to the ground, each of the plurality of transmission elements includes a piezoelectric element and an acoustic matching member, each piezoelectric element is configured to oscillate the ultrasonic wave, and the transmission surface is disposed on each acoustic matching member, the transmission surface is exposed and directed to the object, the acoustic matching member of each transmission element conducts the ultrasonic wave oscillated by the piezoelectric element of the each transmission element to the transmission surface so that the ultrasonic wave is sent from the transmission surface; and vibrating the transmission surfaces of the first combination of transmission elements in a substantially same phase so that the transmission surfaces of the first combination vibrate in an integral manner, and thereby, transmitting the ultrasonic wave with a first directivity while preventing vibration conduction between one transmission element and another transmission element by using a vibration damping member that (i) is located between the plurality of transmission elements so as to be proximal to each transmission surface, (ii) damps the ultrasonic wave conducing therethrough, and (iii) has an elasticity smaller than that of the acoustic matching member, wherein each of the plurality of transmission elements is configured to individually vibrate to thereby transmit the ultrasonic wave with a second directivity, and wherein the second directivity is different from the first directivity.

2. The method according to claim 1, wherein:

the transmission surfaces of the plurality of transmission elements are arranged so as to form a first inclined row and a second inclined row;

each of the first and second inclined rows is substantially inclined at 45 degrees with respect to the vertical direction substantially perpendicular to the ground; and each of the first and second inclined rows includes transmission elements whose transmission surfaces are located adjacent to each other.

3. The method according to claim 1, wherein the first combination of transmission elements are arranged in the vertical direction.

4. The method according to claim 1, wherein the first combination of transmission elements are arranged in the horizontal direction.

5. The method according to claim 1, wherein the first combination of transmission elements are asymmetrically arranged between in the horizontal direction and in the vertical direction.

6. The method according to claim 1, further comprising:

selecting a second combination of transmission elements from among the plurality of transmission elements so that the second combination of transmission elements is different from the first combination of transmission elements in one of arrangement and the number of transmission elements;

vibrating the transmission surfaces of the second combination of transmission elements in a substantially same phase so that the transmission surfaces of the second combination vibrate in an integral manner, and thereby, transmitting the ultrasonic wave with a third directivity, wherein the third directivity is different from the first directivity; and alternately transmitting the ultrasonic wave with the first directivity and that with the third directivity.

7. The method according to claim 1, wherein each transmission element functions as the reception element.

8. An apparatus for transmitting an ultrasonic wave, comprising:

a plurality of transmission elements, each of which has a transmission surface for ultrasonic wave transmission, wherein the transmission surfaces of the plurality of transmission elements are arranged in an array, wherein each transmission surface is configured to individually vibrate to transmit the ultrasonic wave with a first directivity;

a vibration damping member that damps the ultrasonic wave conducting therethrough and is located between the plurality of transmission elements so that the vibration damping member is proximal to each transmission surface;

a reception element that is configured to receive and sense the ultrasonic wave reflected by an object; and a control circuit that is configured to select a first combination of transmission elements from among the plurality of transmission elements so that the first combination of transmission elements includes at least two transmission elements adjacent to each other, wherein the control circuit is configured to cause the transmission surfaces of the first combination of transmission elements to vibrate in a substantially same phase so that the transmission surfaces of the first combination vibrate in an integral manner, and thereby, the ultrasonic wave with a second directivity is transmitted from the first combination of transmission elements, the first directivity is different from the second directivity the apparatus is mounted to a vehicle and configured to sense an object existing around the vehicle, the transmission surfaces of the plurality of transmission elements are arranged so as to form a horizontal row and a vertical row, the horizontal row is parallel to a horizontal direction, which is substantially parallel to a ground, the vertical row is parallel to a vertical direction, which is substantially perpendicular to the ground, each of the plurality of transmission elements includes a piezoelectric element and an acoustic matching member, each piezoelectric element is configured to oscillate the ultrasonic wave;

the transmission surface is disposed on each acoustic matching member, the transmission surface is exposed and directed to the object, the acoustic matching member of each transmission element conducts the ultrasonic wave oscillated by the piezoelectric element of the each transmission element to the transmission surface so that the ultrasonic wave is sent from the transmission surface, and an elasticity of the vibration damping member is smaller than that of each acoustic matching member so that the vibration damping member prevents vibration conduction between one transmission element and another transmission element.

9. The apparatus according to claim 8, wherein:
the transmission surfaces of the plurality of transmission elements are arranged so as to form a first inclined row and a second inclined row;
each of the first and second inclined directions are substantially inclined at 45 degrees with respect to the vertical direction substantially perpendicular to the ground; and
each of the first and second inclined rows includes transmission elements whose transmission surfaces are located adjacent to each other.

10. The apparatus according to claim 8, wherein the first combination of transmission elements are arranged in the vertical direction.

11. The apparatus according to claim 8, wherein the first combination of transmission elements are arranged in the horizontal direction.

12. The apparatus according to claim 8, wherein the first combination of transmission elements are asymmetrically arranged between in the horizontal direction and in the vertical direction.

13. The apparatus according to claim 8, wherein:
the control circuit selects a second combination of transmission elements from among the plurality of transmission elements so that the second combination of transmission elements is different from the first combination of transmission elements in one of arrangement and the number of transmission elements;
the control circuit causes the transmission surfaces of the second combination of transmission elements to vibrate in a substantially same phase so that the transmission surfaces of the second combination vibrate in an integral manner, and thereby, the ultrasonic wave with a third directivity is transmitted from the transmission surfaces of the second combination of transmission elements;
the third directivity is different from the second directivity; and
the control circuit causes alternately the first and second combinations to vibrate, and causes alternate transmission of the ultrasonic wave with the second directivity and that with the third directivity.

14. The apparatus according to claim 8, wherein each transmission element functions as the reception element.

15. A method for transmitting an ultrasonic wave by using an ultrasonic sensor including a plurality of transmission elements each having a transmission surface for ultrasonic wave transmission, the plurality of transmission surfaces being arranged in an array, the ultrasonic sensor further including a reception element for receiving and sensing the ultrasonic wave reflected by an object, wherein the ultrasonic wave with a first radiation pattern and a first detection range is transmitted from one of the plurality of transmission elements when the one of the plurality of transmission elements vibrates while the others of the plurality of transmission elements is not vibrating, the method comprising:

selecting a first combination of transmission elements from among the plurality of transmission elements so that the first combination of transmission elements includes at least two transmission elements adjacent to each other wherein the ultrasonic sensor is mounted to a vehicle and configured to sense an object existing around the vehicle, the transmission surfaces of the plurality of transmission elements are arranged to form a horizontal row and a vertical row, the horizontal row is parallel to a horizontal direction, which is substantially parallel to a ground, and the vertical row is parallel to a vertical direction, which is substantially perpendicular to the ground, each of the plurality of transmission elements includes a piezoelectric element and an acoustic matching member, each piezoelectric element is configured to oscillate the ultrasonic wave, and the transmission surface is disposed on each acoustic matching member, the transmission surface is exposed and directed to the object, the acoustic matching member of each transmission element conducts the ultrasonic wave oscillated by the piezoelectric element of the each transmission element to the transmission surface so that the ultrasonic wave is sent from the transmission surface; and vibrating the transmission surfaces of the first combination of transmission elements in a substantially same phase so that the transmission surfaces of the first combination vibrate in an integral manner, and thereby, transmitting the ultrasonic wave with a second radiation pattern and a second detection range, wherein the second radiation pattern is narrower than the first radiation pattern, wherein the second detection range is longer than the first detection range while preventing vibration conduction between one transmission element and another transmission element by using a vibration damping member that
  (i) is located between the plurality of transmission elements so as to be proximal to each transmission surface,
  (ii) damps the ultrasonic wave conducting therethrough, and
  (iii) has an elasticity smaller than that of the acoustic matching member;
selecting a second combination of transmission elements from among the plurality of transmission elements so that the second combination of transmission elements includes at least two transmission elements adjacent to each other, wherein the second combination of transmission elements is different from the first combination of transmission elements in one of arrangement and the number of transmission elements; and
vibrating the transmission surfaces of the second combination of transmission elements in the substantially same phase, thereby transmitting the ultrasonic wave with a third radiation pattern and a third detection range, wherein
  the third radiation pattern is narrower than the first radiation pattern and is different from the second radiation pattern, and
  the third detection range is longer than the first detection range and is different from the second detection range.

* * * * *